UNITED STATES PATENT OFFICE.

ARNOLD STEINER, OF BASEL, SWITZERLAND, ASSIGNOR TO THE CORPORATION OF CHEMICAL WORKS FORMERLY SANDOZ, OF BASEL, SWITZERLAND.

PROCESS OF MAKING CAMPHENE.

No. 890,465.    Specification of Letters Patent.    Patented June 9, 1908.

Application filed June 24, 1907. Serial No. 380,455.

*To all whom it may concern:*

Be it known that I, ARNOLD STEINER, doctor of philosophy, chemist, and resident of 81 Socinstrasse, Basel, Switzerland, have invented new and useful Improvements in the Manufacture of Camphene, of which the following is a specification.

It is known that the saponification of pinenehydrochlorid is greatly promoted by soda lye or lime water in presence of weakly acid compounds such for instance as phenols and naphthols. I have now found that the same result of improving the rapidity of saponification is obtained by employing perfectly neutral compounds such as alkali salts and earth alkali salts of the aromatic sulfonic acids. If pinenehydrochlorid is heated for 12 hours at 160° C. in an autoclave with an excess of four times the theoretical quantity of soda lye, about 40% of the hydrochloric acid is split off. The amount split off becomes however quantitive if the pinenehydrochlorid is heated during the same time and at the same temperature in presence of a small excess of soda lye and of a concentrated solution of the sodium salt of p-toluolsulfonic acid for example. I have found as the consequence of researches made on a series of salts of sulfonic acids that this property of accelerating the saponification is general to the alkali and earth alkali salts of the aryl- and aryl-oxy- mono- and polysulfonic acids.

The rapidity of saponification is naturally greater with the alkalies than with the earth alkalies. The method is approximately the same for the different salts and is as follows:—Heat the pinenehydrochlorid in an autoclave to about 160-170° C. for 12 to 20 hours with more or less concentrated solutions of salts of a sulfonic acid to which has been added the necessary quantity of alkali-lye or earth alkali.

*Example I—Soda lye and sodium salt of a monosulfonic acid of the benzene series.—* Into an autoclave provided with a stirrer are introduced:—173 parts of pinenehydrochlorid; 250 parts of the sodium salt of p-toluenesulfonic acid 215 parts of soda lye of 33% strength; 180 parts of water; heat for 10 to 11 hours at 170° C.

*Example II—Soda lye and sodium salt of a monosulfonic acid of the naphthalene series.—* Replace the mixture as given above by the following and proceed in the same way: 173 parts of pinenehydrochlorid; 250 parts of the sodium salt of beta-naphthalene sulfonic acid 215 parts of soda lye (33%) 250 parts of water.

*Example III—Soda lye and sodium salt of a disulfonic acid.—*Heating during 15 hours to 170° C. 173 parts of pinenehydrochlorid; 250 parts of the sodium salt of 2.7. naphthalene disulfonic acid 215 parts of soda lye (33%) 150 parts of water.

*Example IV— Soda lye and sodium salt of naphtholdisulfonic acid.—*Heating during 12 hours at 160° C. 173 parts of pinenehydrochlorid; 178 parts of Beta-naphthol-disulfonic acid having the formula

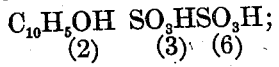
$$C_{10}H_5OH \cdot SO_3H \cdot SO_3H;$$
$$(2) \quad (3) \quad (6)$$

125 parts of soda lye (33%); 85 parts of water.

In these four examples we proceed as follows when the hydrochloric acid is separated, the crystalline mixture which is semi-solid, is dissolved in a little water and the camphene which has been formed is distilled off with steam.

The remaining solution is filtered off from the by-products which have formed in small quantities, and the sulfonic acids are regenerated by concentrating or salting out in the well known manner.

A test of the oil is taken from the autoclave and distilled over with steam; the camphene is wholly free from chlorin as soon as the liquid distilled over, when brought on a gauze of copper wire into the flame of a Bunsen burner, no longer shows a green coloration of the flame.

*Example V—Lime and calcium salt of a monosulfonic acid.—*Prepare lime water in the autoclave with 90 parts of lime and 300 parts of water and add 250 parts of the calcium salt of p-toluene-sulfonic acid. To this paste add 173 parts of pinene hydrochlorid and heat during 20 hours to 160°. When the operation is complete, dilute with a little water, neutralized with sulfuric acid and distil the camphene with steam.

The invention consists in substance in preparing camphene by heating pinenehydrochlorid at relatively high temperatures and under pressure with alkali hydroxids or with hydrates of the earth alkali metals, in presence of the sulfonic acid alkali compounds or earth alkali salts of the benzene or naphthalene series.

Now what I claim and desire to secure by Letters Patent is the following:

1. The process of manufacturing camphene which consists in heating, under pressure, pinene hydrochlorid together with alkalies in the presence of aromatic sulfonic acid salts and distilling off the camphene with steam.

2. The process of manufacturing camphene which consists in heating, under pressure, pinene hydrochlorid together with soda lye in the presence of the sodium salt of p-toluene sulfonic acid and distilling off the camphene with steam.

In testimony, that I claim the foregoing as my invention, I have signed my name in presence of two witnesses, this first day of June 1907.

ARNOLD STEINER.

Witnesses:
MELCHIOR BÖNIGER,
GEORGE WAGNER.